United States Patent [19]

Sexsmith et al.

[11] 3,904,592
[45] Sept. 9, 1975

[54] URETHANE-MALEIMIDE SYSTEM FOR CROSS-LINKING UNSATURATED ELASTOMERS

[76] Inventors: Frederick H. Sexsmith, 5548 Bondy Dr., Erie, Pa. 16509; Nicholas J. Gervase, 1316 W. 37th St., Erie, Pa. 16508

[22] Filed: Nov. 13, 1972

[21] Appl. No.: 305,989

[52] U.S. Cl. ........ 260/83.3; 252/182; 260/77.5 TB; 260/79.5 C; 260/79.5 A; 260/79.5 B; 260/80.78; 260/85.3 C; 260/92.3; 260/94.7 A; 260/768
[51] Int. Cl.².. C08C 11/40; C08C 9/00; C08D 9/00
[58] Field of Search .............. 260/79.5 C, 768, 83.3, 260/77.5 TB, 85.3 C, 92.3, 94.7 A; 252/182

[56] References Cited
UNITED STATES PATENTS

| | | | |
|---|---|---|---|
| 3,506,624 | 4/1970 | Behrens | 260/78.4 |
| 3,721,659 | 3/1973 | Cain | 260/83.3 |

*Primary Examiner*—Christopher A. Henderson, Jr.

[57] ABSTRACT

A system for cross-linking, curing, or "vulcanizing" elastomers containing a moderate to high degree of olefinic unsaturation is described which employs synergistic mixtures of known urethane and maleimide cross-linking agents in conjunction with a known accelerator for the urethane component. The proportion of maleimide to urethane cross-linking agent in the curing composition may range from about 4:1 to about 0.1:5 and is preferably about 3:2 to about 1:4 parts by weight. The curing compositions are employed at curing temperatures known to the art, i.e., in the range from about 250° to 400°F; the amount of the curing composition containing the mixed urethane-maleimide cross-linking agents required to obtain a given density of cure being less than the amount of cross-linking agent required if either a urethane or maleimide cross-linking agent is employed alone. Vulcanizates having good processing safety, high reversion resistance, low compression set, excellent dynamic properties and resistance to thermal and oxidative degradation on aging are obtained.

37 Claims, 3 Drawing Figures

URETHANE-MALEIMIDE SYSTEM FOR CROSS-LINKING UNSATURATED ELASTOMERS

BACKGROUND OF THE INVENTION

It is well-known that sulfur and sulfur compounds have been used in the vulcanization of rubber for more than a century and that such systems have reached a high degree of development. Vulcanization with sulfur is economical, and provides excellent cures under generally convenient operating conditions to produce vulcanizates having excellent strength and fatigue properties. It has been widely recognized, however, that sulfur-vulcanized rubbers are less than desirably resistant to compression set, cure reversion, and thermal and oxidative degradation on aging. In recent years, the use of lower than normal sulfur ratios or higher accelerator ratios in the so-called efficient vulcanizing (EV) systems has provided greater resistance to reversion and aging, but at the expense of the dynamic properties of the rubber product. Still more recently, modified semi-EV sulfur vulcanization systems have partially combined the advantages and obviated the disadvantages of the traditional and EV sulfur vulcanization systems.

Despite these advances in the art, it has long been recognized that there has also been a need for non-sulfur vulcanizing systems, not only to eliminate the sulfur content of the vulcanizate which cannot be tolerated in some applications, but also to achieve greater production efficiency by the use of shorter curing cycles at higher curing temperatures than are operable in the sulfur systems. There has also been a trend, which is still continuing, toward more and more stringent conditions of use for cured rubber products necessitating performance characteristics which cannot be satisfactorily met by the products of the older sulfur vulcanization systems.

THE PRIOR ART

One such non-sulfur vulcanizing system is described in "Vulcanization With Maleimides" by Tawney et al. which was published in the Journal Of Applied Polymer Science, Vol. 8, pp. 2281 to 2298 in 1964. This reference teaches that maleimides and particularly the bismaleimides, are advantageous curing agents for all saturated and unsaturated hydrocarbon rubbers except those containing a high percentage of isobutylene units, since the physical properties of rubbers cured by these materials are independent of the curing temperature, thus permitting more efficient high temperature cures. The resulting vulcanizates also have the good aging characteristics typical of non-sulfur cured vulcanizates. The Tawney et al. reference and subsequent experience teaches that such maleimide curing systems must be initiated with peroxides, or sulfur-containing accelerators, such as those of the thiazol type, for example.

Baker et al., in "New Reactions For The Vulcanization Of Natural Rubber", published in *Rubber Chemistry & Technology*, Vol. 43, No. 3, May 1970, also describe non-sulfur vulcanizing systems. The discussion of urethane cross-linking systems for rubber at pages 510 through 519 of this reference is particularly of interest. Basically, such urethane cross-linking systems involve treating natural rubber or other polyunsaturated elastomers with nitrosophenols or nitrosoanilines to react the nitroso groups with the rubber molecule, thus providing pendant hydroxyl or amino groups, which are then reacted with diisocyanates to obtain the desired cross-linking. This may be accomplished in several different ways, but the preferred method is to prereact a nitrosophenol, probably in its oxime form, with a diisocyanate to produce a compound which is generally and conveniently referred to as a diurethane, although it is not a true urethane. Such diurethanes are stable, non-staining and non-hazardous materials which can be readily incorporated into rubber and which decompose at temperatures of about 120° to 200°C., depending on their structure, into free nitrosophenol and diisocyanate which are then available for cross-linking under conventional vulcanizing conditions.

It has been found that the efficiency of cross-linking obtainable with such a diurethane system can be raised to a high level, e.g. 50% based on the available nitrosophenol, by the addition of excess diisocyanate and the use of certain catalysts, particularly the dithiocarbamates. The physical properties of the diurethane vulcanizates are good in all respects and are close to those of the best highstrength sulfur vulcanizates. These materials are also relatively free of reversion to which sulfur vulcanizates are particularly susceptible. The diurethane vulcanizates are also desirable in that they have inherently superior aging characteristics even when compared to sulfur vulcanizates containing added antioxidants. The addition of antioxidants to the diurethane vulcanizates further improves their resistance to degradation on aging.

While, as noted above, both the bismaleimide and diurethane vulcanization systems provide cured rubbers having certain advantages, these curing systems are relatively expensive in comparison to sulfur vulcanization systems and, for this reason, the resulting vulcanizates are generally restricted to use in premium applications where their excellent properties are required and their cost can be justified.

The maleimide and bismaleimide curing systems are further described in U.S. Pat. Nos. 3,153,014; 2,818,405; 2,925,407 and 2,989,504. The maleimides useful in these curing systems and their preparation are described in U.S. Pat. No. 2,444,536 and 2,462,835. The urethane and diurethane systems are further described in British Pat. Nos. 1,255,646 and 1,255,647 and U.S. Pat. No. 3,645,980 which corresponds to the former; and in "Rubber World", November 1971, pp. 77 to 79. Particularly useful diurethanes derived from isocyanate dimers are described in co-pending U.S. Patent application Ser. No. 284,032 filed Aug. 28, 1972, now abandoned of our coworker Brian Martin. The isocyanate dimers used in preparing these diurethanes are described in U.S. Pat. No. 2,671,082. The compounding of organic isocyanates and aromatic dinitroso compounds or aromatic dioximes with butyl rubber is described in U.S. Pat. No. 2,690,780.

While the bismaleimide and diurethane cross-linking systems for unsaturated rubbers offer the advantages enumerated previously, it is apparent that a need still exists in the art for a more efficient and lower cost vulcanization system capable of providing cured rubber products having properties making them useful under the most stringent current operating conditions.

It is an object of the present invention, therefore, to provide a novel vulcanization system for moderately to highly unsaturated elastomers which is more efficient and less costly than presently available non-sulfur vulcanization systems, but which is capable of producing vulcanizates having good processing safety, high reversion resistance, low compression set, excellent dynamic properties, and good resistance to thermal and oxidative degradation on aging.

It is another object of the invention to provide novel vulcanizing compositions which are capable of vulcanizing unsaturated elastomers to produce vulcanizates with a spectrum of properties superior to that obtainable with either the urethane or maleimide curing systems alone.

BRIEF SUMMARY OF THE INVENTION

The foregoing and other objects of the invention which will become apparent below are attained by a new system for the vulcanization of natural and synthetic unsaturated elastomers in which known maleimide and urethane vulcanizing agents are employed, in combination, optionally together with an accelerating agent for the urethane cross-linker, but without the use of any known initiating or accelerating agent for the maleimide component of the system. The new vulcanizing compositions are incorporated in the unsaturated elastomer to be cured at concentrations from about 0.1 to about 26 parts and preferably about 3 to about 8 parts by weight per hundred parts by weight of the elastomer.

The amount of bismaleimide in the elastomer to be cured will be at least about 0.1 parts per hundred (phr) parts of the elastomer. The upper limit will be about 6 phr. The preferred concentrations for most purposes, however, will be in the range from about 0.5 to about 3 phr. Less than 0.1 phr of the maleimide will, of course, give some effect, whereas amounts in excess of about 6 phr will generally be unnecessary and uneconomic. The amount of urethane cross-linking agent employed will generally range from about 1 to 20 phr, about 2 to about 8 phr being preferred, although somewhat smaller or larger amounts may be employed as known in the art. The amount of diurethane taken in parts per hundred of elastomer will of necessity depend on its equivalent weight as a urethane or as a derived nitroso species. For example, the diurethane of nitrosophenol and toluene diisocyanate (TDI) has an equivalent weight as a cross-linker of 420 whereas the equivalent weight for the diurethane of TDI dimer and nitrosated 2,6 xylenol is 628. If one took 4.20 parts per hundred of the former cross-linker, one would expect an equivalent level of cross-linking from 6.28 parts per hundred of the latter diurethane. The ratio of maleimide to urethane in the vulcanizing compositions can be from about 4:1 to about 0.1:5, and is preferably about 3:2 to about 1:4; a ratio of about 1:4 being especially preferred.

Any of the urethanes known to cross-link unsaturated rubber or other elastomers may be employed in the invention, the diurethanes being preferred and, in particular, the diurethane derived from 2,4-toluene diisocyanate dimer and p-nitroso-2,6-xylenol (DUT$_2$X). The urethane component generally will be selected on the basis of (1) efficiency of cure, (2) rate of cure, and (3) processing safety. Similarly, any of the maleimides known to be useful in cross-linking unsaturated rubber, and particularly the bismaleimides, are useful in this invention; m-phenylene-dimaleimide being particularly preferred.

The need for an accelerator agent varies, and depends on the type of elastomer being vulcanized and on the type and amount of the urethane component. Where advantageous, the accelerator is employed in the range from about 0.1 to about 8 parts, and preferably from about 1.5 to 2.5 parts by weight per 100 parts of elastomer.

Where not needed, deletion of the accelerator is an obvious economic advantage, and may also be advantageous from the viewpoint of processing safety.

The new system is superior to either the diurethane or maleimide systems of the prior art in that it produces vulcanizates having high reversion resistance, low compression set, excellent dynamic properties and good resistance to thermal and oxidative degradation on aging and does so with greater efficiency and lower cost than either of the prior systems. The operability of the new system and its superior efficiency are both surprising since, as noted above, the initiators known to the prior art to be essential for vulcanization with maleimides are omitted entirely. In the new system, known accelerators are employed to activate the diurethane or other urethane cross-linkers but such accelerators are not known to initiate or activate the maleimides. Although the Applicants do not wish to be bound by any theory of operation, they believe that the efficiency and high degree of cross-linking achieved by the present invention is due in part to the diurethane or other urethane cross-linking activated by an accelerator such as zinc dimethyldithiocarbamate (ZDMC) or even zinc oxide, with the remainder being derived from the maleimide component activated by the diurethane or urethane, thus resulting in a synergistic enhancement of the cure. Inasmuch as the urethane and maleimide cross-linking agents are relatively expensive materials and the present invention permits a reduction in the total amount of such cross-linking agents required to obtain a given degree of cross-linking or vulcanization, the invention provides not only increased efficiency of vulcanization and vulcanized products having an improved spectrum of properties, but a substantial reduction in the cost of vulcanization as well.

BRIEF DESCRIPTION OF THE INVENTION

FIG. 1 is a graph containing two curves showing the degree of cure of Neoprene rubber obtained by compositions of the invention containing varying proportions of a bismaleimide and a urethane at 307° and 360°F., respectively.

FIG. 2 is a graph containing a cure showing the variation in the modulus at 300% elongation of Neoprene cured with the compositions of FIG. 1; and FIG. 3 is a graph containing two curves showing (a) the variation in tensile strength and (b) the variation in the modulus at 300% elongation of natural rubber samples cured at 370°F. with compositions of the invention containing varying proportions of a bismaleimide and a urethane.

DETAILED DESCRIPTION OF THE INVENTION

Figure 1:
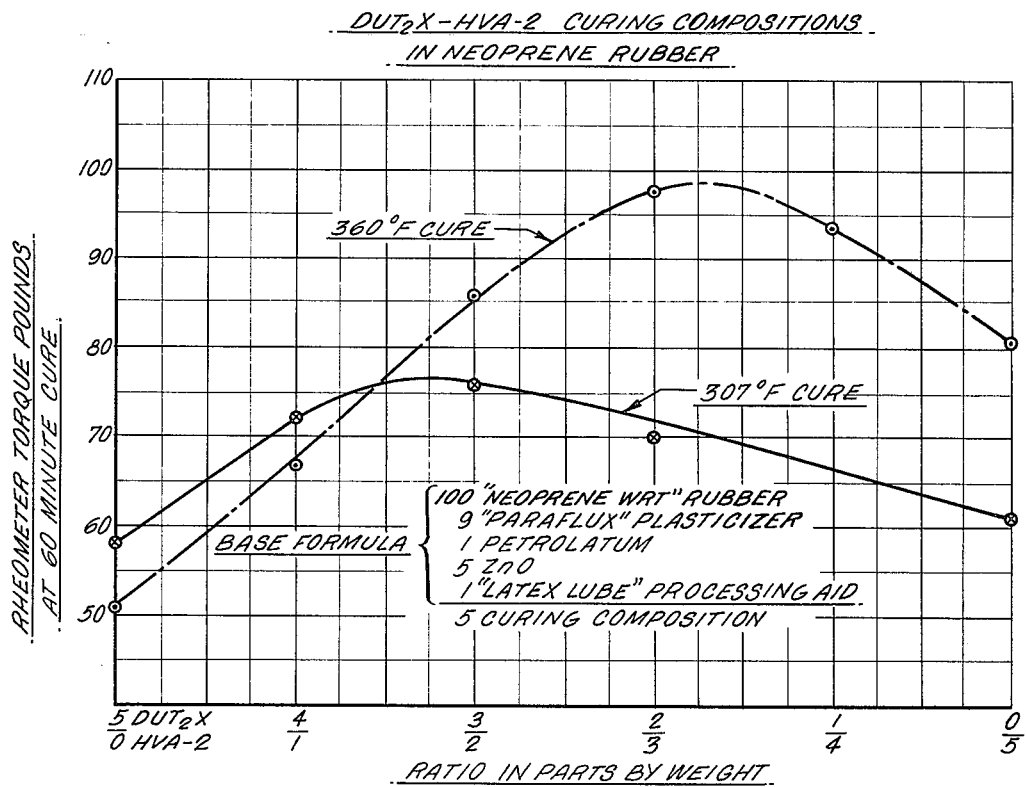

The present invention provides a highly efficient, relatively low cost, non-sulfur vulcanization system for unsaturated elastomers. While the system is particularly suitable for the curing of natural rubbers, it is also useful for the vulcanization of synthetic rubbers or other elastomers containing substantial amounts of either olefinic unsaturation or other groups capable of reacting with aromatic nitroso groups. Such unsaturated elastomers include, without limitation, "Neoprene" (polychloroprene rubber), styrene-butadiene rubber (SBR), polybutadiene, butadiene-acrylonitrile rubbers and other dienic homopolymers and copolymers, for example, among other useful elastomers. However, due to their low degree of unsaturation, the new system is less suitable for the vulcanization of certain ethylene-propylene terpolymers (EPDM rubber) or butyl rubber.

As noted above, any known urethane system or composition capable of cross-linking unsaturated elastomers or rubbers may be used in the present invention. As is well-known, such urethane vulcanization systems are based on the reaction of the nitroso group of a nitrosophenol or nitrosoaniline with an olefinically or otherwise unsaturated group in the rubber or other elastomer to provide a pendent hydroxyl or amino group at that position on the rubber molecule. The reactive hydroxyl and amino groups appended to the elastomer back-bone in this way provide sites for cross-linking by reaction with any suitable polyfunctional compound. While aromatic dialdehydes and dicarboxylic acids and the carbodiimides may be used, the preferred polyfunctional compounds for this purpose are the di- or higher polyisocyanates.

While, as suggested in the prior art, these reactions may be carried out in a variety of different sequences to provide the desired cross-linking, it has come to be preferred to pre-react the nitroso compound and polyfunctional compound to form a cross-linking agent which can be compounded with the elastomer to be cross-linked and then activated by heat. When the polyfunctional compound is a di- or polyisocyanate, the resulting compounds are generally referred to as di- or polyurethanes, although they are not true urethanes, since they are the reaction products of an isocyanate with an —NOH group rather than a —COH group. Such di- and polyurethanes are described in British Pat. No. 1,255,647, the entire disclosure of which is incorporated herein by reference. These di- or polyurethanes can be prepared, as known in the art, by reacting a suitable di- or polyisocyanate with a suitable nitrosophenol in stoichiometric proportions in an inert hydrocarbon solvent for about 2 hours at 40°C. with or without the aid of a catalyst such as triethylenediamine. This reaction may be represented as follows:

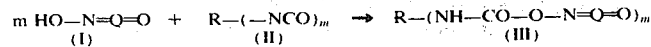

In the above formula, R represents an aromatic or aliphatic hydrocarbon nucleus, Q is an aromatic group in the quinonoid configuration and m is an integer which equals 2 or more.

Compound I above may be any nitroso compound of the formula in which Q is an aromatic ring either substituted or unsubstituted in the quinonoid structure. Therefore, the ortho-, meta- and para-nitrosophenols are operable, including both the unsubstituted compounds and those in which the aromatic ring carries one or more substituents such as alkyl, aryl, halogen, nitro or carboxyl groups, for example, which do not interfere with the desired function of the nitroso and hydroxyl or amine groups in the compound. The ortho- and meta-nitrosophenols are, of course, less preferred since they are not presently commercially available. Preferred substituted nitrosophenols include p-nitroso-2,6-xylenol, p-nitroso-3cresol and nitrosated o-chlorophenol.

Compound II above may be any suitable polyfunctional compound, as noted previously, but is preferably a di- or polyfunctional isocyanate. The preferred isocyanates include, without limitation, benzene diisocyanate, methylene di(phenylisocyanate) (MDI), naphthalene diisocyanate and the especially preferred 2,4-toluene diisocyanate (TDI). In addition to these aromatic diisocyanates, aliphatic isocyanates such as 4,4'-diisocyanato-dicyclohexane, available as "Hylene W" from E. I. du Pont de Nemours are also useful. Among the higher polyisocyanates useful in the invention are triphenyl methane triisocyanate, and polymethylene polyphenylisocyanate, a liquid polymeric MDI material which may be represented by the formula

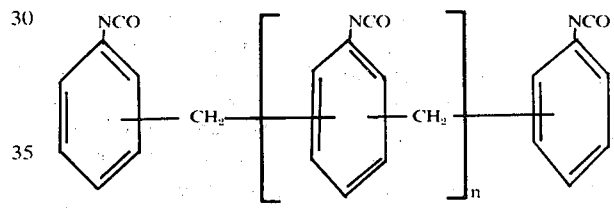

in which n has an average value of from 0 to 1. Such polymethylene polyphenylisocyanates are well-known materials available commercially as "PAPI" from the Upjohn Company and as "Mondur MR" from Mobay Chemical Company. Other useful isocyanates are the aromatic diisocyanate dimers, such as those described in U.S. Pat. No. 2,671,082. Many of the compounds referred to above, which have the required two isocyanate groups, may be converted to the corresponding dimer by contact with a phosphine catalyst as described in this patent. A particularly preferred dimer is that of toluene-2,4-diisocyanate (TDI) which may be represented as follows:

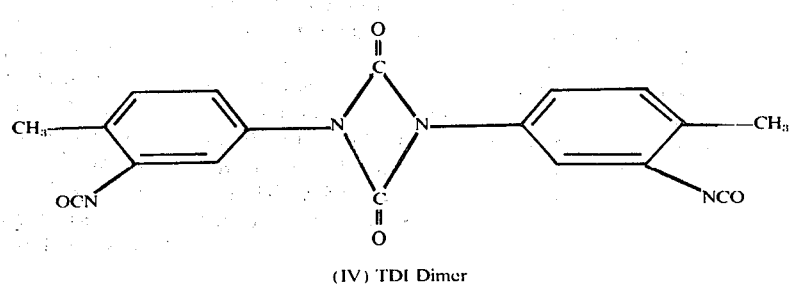

(IV) TDI Dimer

Dimers such as the above react with nitrosophenol to provide di- and polyurethanes in the same manner as the simpler diisocyanate of formula II above.

For convenience of description the term "polyisocyanate" will be used hereinafter to refer to all of the operable isocyanate compounds, including the diisocyanates, tri- and higher polyisocyanates, and the dimers referred to above. When a nitroso compound I is reacted with such a polyisocyanate, a polyurethane such as compound III or an analog thereof is obtained depending on the complexity of the polyisocyanate. The preferred polyurethanes are the diurethanes derived from toluene-2,4-diisocyanate dimer with either p-nitroso-2,6-xylenol or p-nitroso-cresol which will be referred to hereinafter as $DUT_2X$ and $DUT_2C$, respectively. Other useful diisocyanates include the reaction products of a diisocyanate and a polyalkylene ether glycol which are available under the trademark "Adiprene" from E. I. du Pont de Nemours & Company.

In curing unsaturated elastomers with diurethanes of the type described above, it has been the practice in the art, as suggested in British Pat. No. 1,255,646, to add excess di- or polyisocyanate to the diurethane in order to increase the efficiency of the cross-linking. It is also well-known that free polyisocyanate can react with moisture or other forms of active hydrogen, resulting in abortive loss of vulcanization potential or the liberation of carbon dioxide with consequent undesirable porosity of the vulcanizate. Since free isocyanate also is physiologically hazardous, it is desirable to avoid the use of such excess polyisocyanate, if possible. It is for these reasons that the polyisocyanate dimers described above are preferred since they are effective cross-linkers and do not contain or require the use of free isocyanate.

Elastomer curing, cross-linking or "vulcanization" is carried out with the previously described urethanes by incorporating them in a suitable unsaturated elastomer according to conventional procedures in amounts from about 1 to about 16 or preferably about 2 to about 8 parts by weight per 100 parts of dry elastomer and heating the mixture to conventional curing temperatures to cross-link the elastomer. While somewhat lower or higher temperatures may be employed, temperatures in the range from about 250° to about 400 F. are sufficient to cause the urethanes to break-down into their nitroso and isocyanate components which are then available to bring about cross-linking at those temperatures as described above.

As is also well-known, such urethane cross-linking is often facilitated by the incorporation in the elastomer-urethane mixture of an accelerator. Such known accelerators include the metal salts of thiols such as the zinc, cadmium, tellurium, bismuth, stannous and lead dithiocarbamates. The dialkyldithiocarbamate and dithiophosphate salts of these metals are particularly useful. The preferred accelerator for natural rubber is zinc dimethyldithiocarbamate (ZDMC). For polychloroprenes such as "Neoprene WRT", zinc oxide is an effective accelerator. The amount of accelerator employed to aid in curing the elastomer is not critical. For example, when ZDMC is used the amounts may range from about 0.1 to about 5, and are preferably from about 1.5 to 2.5 parts by weight per 100 parts of elastomer (phr)..

A drying agent may optionally be added to the urethane elastomer curing system to react with any water present to prevent its reaction with diisocyanate thus consuming cross-linker and generating carbon dioxide. This facilitates the efficient production of non-porous cured elastomer. The drying agent, such as calcium oxide, for example, is added to the mixture in amounts of about 0.5 to 4 phr, if used.

As noted above, the present invention resides in the use of maleimide or related cross-linking agents in conjunction with a urethane curing system in order to achieve greater efficiency of cross-linking and better products than are obtainable with either system alone. While all of the maleimide and related compounds disclosed in the prior art references referred to above which are known to cross-link unsaturated elastomers may be used in the present invention, it is the bismaleimides suggested for this purpose in U.S. Pat. No. 2,989,504 which are preferred, and the disclosure of that patent is incorporated herein by reference. Certain of these bismaleimides and their preparation are described in U.S. Pat. Nos. 2,444,536 and 2,462,835; the disclosures of which patents are also incorporated herein by reference. Without limitation, the preferred bismaleimides are the N,N'-linked bis-maleimides which are either joined directly at the nitrogen atoms without any intervening structure or in which the nitrogen atoms are joined to and separated by an intervening divalent radical such as alkylene, cycloalkylene, oxydimethylene, phenylene (all three isomers), 2,6-dimethylene-4-alkylphenol or sulfonyl radical. Meta-phenylene bis-maleimide is especially preferred, however, and is commercially available as "HVA-2" from E. I. du Pont de Nemours Company.

The invention will now be illustrated in greater detail by the following specific examples.

EXAMPLE 1

An unsaturated elastomer to be cured was prepared by mixing for approximately one-half hour on a cool two-roll mill 100 parts by weight of a polychloroprene rubber (available from E. I. du Pont de Nemours & Company under the trademark "Neoprene WRT"), 50 parts by weight of carbon black ("SRF-HM": high modulus, semi-reinforcing furnace type), 9 parts by weight of a petroleum hydrocarbon plasticizer (available from C. P. Hall Company under the trademark "Paraflux"), 5 parts by weight of zinc oxide, 1 part by weight of a release agent lubricant (available from Harwick Standard Chemical under the trademark "Petrolatum"), and 1 part by weight of a processing aid (available from DuBoise Chemical Company under the trademark "Latex-Lube"). No sulfur-containing accelerator was employed in the compound.

All concentrations of ingredients in this example and throughout the specification are expressed in parts by weight based upon the weight of 100 parts of the dry, uncompounded elastomer, which concentrations will be referred to hereinafter as "phr", i.e., parts per hundred rubber.

Various test stocks were then prepared using the above base formula and adding to it 5 parts by weight of a cross-linker that is comprised of various mixtures of a diurethane cross-linker and a bismaleimide cross-linker. The actual test stocks ranged from one in which the cross-linker was totally diurethane to one in which the cross-linker was totally bismaleimide.

The diurethane cross-linker used was $DUT_2X$, the diurethane formed by the reaction of 2,4-toluene diisocyanate dimer with 4-nitroso-2,6-xylenol. The bismaleimide was m-phenylene bismaleimide (HVA-2). These cross-linkers were incorporated into the rubber in six different proportions of $DUT_2X$ to HVA-2 as follows: 5:0, 4:1, 3:2, 2:3, 1:4, and 0:5.

The diurethane was prepared by grinding 4-nitroso-2,6-xylenol (810 gms, 5.36 moles) in 6.485 liters of naphtha to achieve a fine particle size. The dimer of 2,4-toluene diisocyanate (prepared according to U.S. Pat. No. 2,671,082) (933 gms, 2.68 moles) and triethylenediamine (2 gms) were added to the xylenol-naphtha suspension and the mixture was stirred for a reaction time of about 3 hours at room temperature. The product, which is referred to as $DUT_2X$, was removed by filtration to obtain a yield of 1625 gms or 93% of theory.

The bismaleimide HVA-2 can be prepared according to the methods of U.S. Pat. Nos. 2,444,536; 2,462,835; 2,925,407 or 2,989,504 but is commercially available from E. I. du Pont de Nemours and Company.

The elastomers, fillers, oils and cross-linkers were mill-mixed for about one-half hour, and then tested on the Monsanto Oscillating Disc Rheometer. ASTM D2705-68T describes this test as a standard method for determining the processing and curing characteristics of vulcanizable compounds.

The Rheometer tracing of the all-diurethane containing compound indicated a scorchy stock with a flat but somewhat inefficient cure. The all-bismaleimide-containing stock had a longer scorch but a slower cure and progressively increasing modulus. The various cross-linking mixtures of $DUT_2X$ and HVA-2, however, produced long scorch times, good cure rates, and much greater efficiency of cross-linking than either the all-diurethane or all-bismaleimide systems.

FIG. 1 graphically relates torque pounds, as measured by the Rheometer, to the various cross-linker ratios. It is readily apparent that the cross-linker mixtures are synergistic combinations that produce a much greater degree of cure than would be expected from the additive effect of the two cross-linkers. It should also be noted that the greatest degree of cross-linking occurs at slightly different ratios for differing cure temperatures. At 360°F. the optimum ratio appears to be near $2DUT_2X/3HVA$-2. At 307°F. the optimum is close to the $3DUT_2X/2HVA$-2 level.

Figure 2:
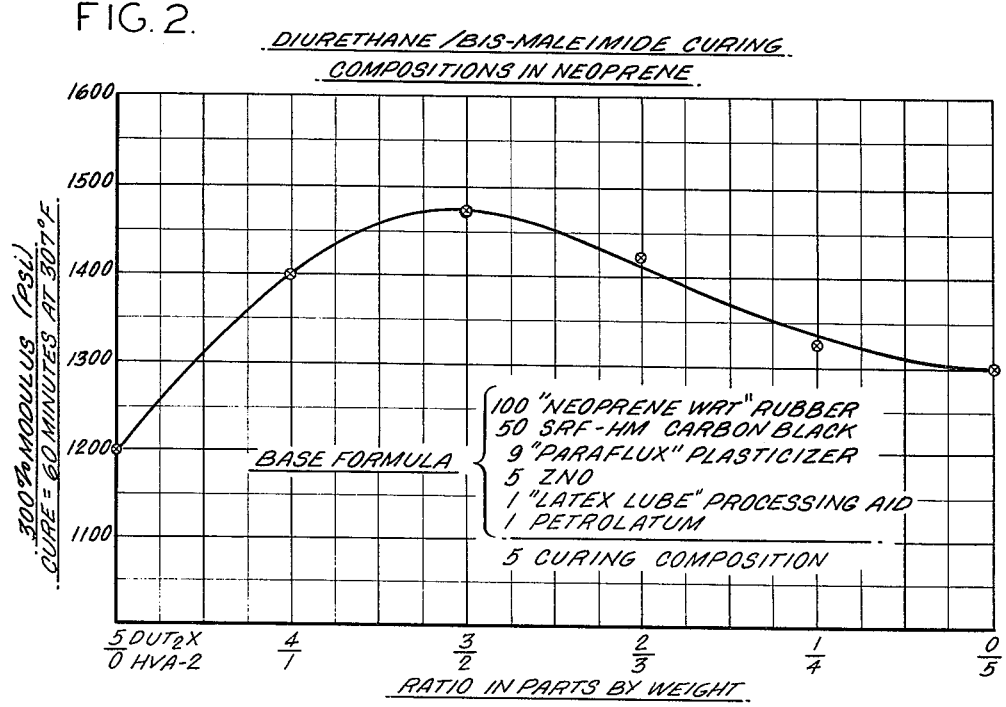

The same stocks were vulcanized and tested by conventional procedures (see ASTM D-412) to determine modulus values at 300% elongation. The values were plotted vs. cross-linker ratio and connected by a smooth curve as shown in FIG. 2. It can be seen that the sample containing all-diurethane cross-linker had a 300% modulus of 1200 psi. The all-bismaleimide-containing stock had a 300% modulus of 1300 psi. All of the mixtures of these two cross-linkers showed higher moduli than either of them separately.

EXAMPLE 2

An unsaturated elastomer to be cured was prepared by blending in a Banbury mixer 100 parts by weight of a standard Malaysian rubber (SMR-5CV), 50 parts by weight of carbon black ("HAF": high abrasion furnace type) and 2 parts by weight of a processing aid comprising an oil soluble sulfonic acid in a petroleum base (available from the R. T. Vanderbilt Company under the trademark "Reogen").

Using the above elastomer as a master batch, test samples were made by first breaking the master batch down on a cool two-roll mill and then adding an accelerator, a diurethane cross-linker and a bismaleimide cross-linker. The accelerator was zinc dimethyl dithiocarbamate (ZDMC) which was incorporated at the 2 phr level. The diurethane cross-linker was $DUT_2X$, the diurethane formed by the reaction of 2,4-toluene diisocyanate dimer with 4-nitroso-2,6-xylenol. The bismaleimide was m-phenylene bismaleimide (HVA-2). These cross-linkers were incorporated in portions of the master batch, together with the 2 phr of ZDMC, in six different proportions of HVA-2 to $DUT_2X$, as follows: 5:0, 4:1, 3:2, 2:3, 1:4 and 0:5.

The cross-linkers, accelerator and rubber were blended for about 5 to 10 minutes, and then cured by heating to a temperature of about 307°F. for 15 to 30 minutes, depending on the time necessary to achieve optimum modulus.

Figure 3:
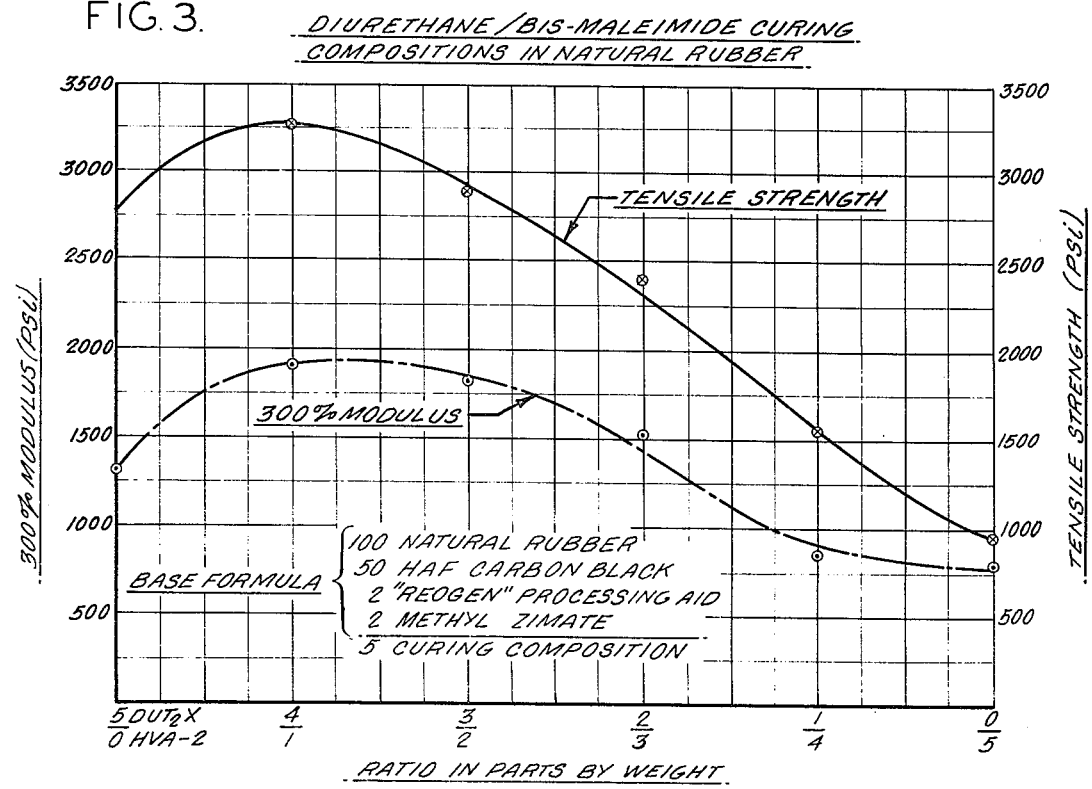

The resulting vulcanizates were then tested by conventional procedures to determine the modulus at 300% elongation (in psi) and tensile strengths (psi) thereof and the values were plotted and connected by smooth curves as shown in FIG. 3 of the drawing. It will be seen that the sample in which the ratio of HVA-2:$DUT_2X$ was 5:0, which, of course, contained no diurethane, had a modulus of only 800 psi and a tensile strength of only about 950 psi. The sample containing no HVA-2 (the ratio of HVA-2 to diurethane being 0:5) had better modulus (about 1320 psi) and tensile strength (about 2800 psi) values than the sample containing no diurethane. However, it is clear that within the range of proportions of HVA-2:$DUT_2X$ from about 0.1:4.9 to about 3:2 the mixture of the bismaleimide with the diurethane produced vulcanizates of markedly superior modulus and tensile strengths compared to the samples containing only the diurethane or bismaleimide alone, or to the samples containing more than a 3:2 ratio of the bismaleimide to the diurethane. It should also be apparent from FIG. 1 that the preferred ratio of the two cross-linkers is about 1:4 of the HVA-2 to the $DUT_2X$ since this provides the peak values of both modulus and tensile strength.

EXAMPLES 3–8

A comprehensive evaluation of the utility of maleimide cross-linking agents in diurethane cured vulcanizates was carried out employing the master batch of rubber described in Example 2 above which contained 100 parts of standard Malaysian rubber (SMR-5CV), 50 phr of HAF carbon black and 2 phr of a processing aid, Reogen. Various cross-linkers were incorporated in separate samples of the master batch to form a series of samples numbered 2(a) through 7(a). A second series of samples numbered 2(b) through 7(b) were identical to the first series except for the inclusion of 2 phr of an antioxidant, polymerized trimethyl dihydroquinoline, which is commercially available as "Agerite Resin D" from R. T. Vanderbilt Company, Inc.

In Example 3, the preferred bismaleimide, m-phenylene bismaleimide (HVA-2), was initiated by the use of a peroxide as in the prior art; see U.S. Pat. No. 2,925,407, for example.

The preferred diurethane of Example 1 above, $DUT_2X$ was employed as the sole cross-linker in Example 4.

The preferred combination of diurethane and bis-maleimide cross-linkers, $DUT_2X$ and HVA-2, was used in Example 5.

Another diurethane curing system of the prior art was used in Example 6, i.e., phenol-blocked MUTC. This material was prepared by adding 2,4-toluene diisocyanate (696 gms, 4 moles) to a solution of phenol (376 gms, 4 moles) in 2.4 liters of naphtha and reacting the mixture for 4 hours at 70°C. The reaction mixture was cooled and the product, which was primarily the adduct of the phenol with the more reactive isocyanate group in the 4-position, was washed and dried. This intermediate (1362 gms) and p-nitroso-m-cresol (570 gms) were separately dissolved in methyl ethyl ketone and added to 9 liters of 15% methyl ethyl ketone, 85% xylene. This mixture was heated to 50°C. for 4 hours, cooled and filtered. The yield was 906 gms of the phenol-blocked diurethane of 2,4-toluene diisocyanate and p-nitroso-m-cresol which will be referred to herein as phenol-blocked MUTC or simply as PB-MUTC.

In Example 7, the phenol-blocked MUTC of Example 6 was employed together with the preferred bis-maleimide HVA-2.

In example 8, a typical EV or efficient vulcanization system was incorporated in the basic rubber to provide a comparison with the other systems described above.

The specific ingredients and the concentrations thereof in parts per hundred parts of the dry master batch of rubber (phr) are set forth in Table I below together with evaluation test data on the resulting vulcanizates. The meaning of the terms in Table I is as follows:

| Term | Definition |
|---|---|
| ZDMC | Zinc dimethyl dithiocarbamate |
| "HVA-2" | m-Phenylene bis-maleimide |
| "DiCup 40C" | Dicumyl peroxide 40% active on clay |
| $DUT_2X$ | Diurethane of 2,4-toluene diisocyanate dimer and 4-nitroso, 2,6-xylenol |
| PB-MUTC | Phenol-blocked monourethane of 2,4-toluene diisocyanate and nitroso-m-cresol |
| MBIS | |
| MBT | Mercaptobenzothiazole — an accelerator |
| MBTS | 2,2'-Benzothiazyl disulfide |
| "Agerite Resin D" | Polymerized trimethyl dihydroquinoline |
| % Reversion at 360°F. | Percentage loss in modulus in psi after aging at 360°F. for one hour |
| Mooney Scorch at 250°F. $t_5$ (ASTM D-1646-72) | Time in minutes before the sample loses fluidity. "$t_5$" is time until a 5 point rise from minimum torque occurs. |
| DeMattia Flex (Kc) (ASTM D-813-59) Unpierced RT 212°F. | Determines the resistance of compounds of vulcanized rubber to crack growth when subjected to repeated bend flexing. Samples are flexed both at ambient temperatures and at 212°F. |
| Pierced RT 212°F. | The pierced samples show cut growth propagation from a hole which is punched in the sample before flex testing is begun. |
| Compression Set (%) 22 hours at 158°F. | The residual deformation of a cured elastomer after removal of a sample from compression under heat as measured by ASTM D-395 Method B |

ASTM D-412-68
Tensile (psi) (Tensile Strength, paragraph 2.5)
(a) Original
(b) 7 Days at 212°F. aged in air (c) % Retention $= c = \dfrac{a-b}{a} \times 100$ Modulus (psi) (Tensile Stress, paragraph 2.4, at given elongation paragraph 2.6)
Original
7 Days at 212°F.
% Retention
Elongation (5) (Ultimate elongation, paragraph 2.7)
Original
7 Days at 212°F.
% Retention

TABLE I

CROSS-LINKER EVALUATION

| | EXAMPLES | | | | | |
|---|---|---|---|---|---|---|
| | 3 | | 4 | | 5 | |
| Formulation | (a) | (b) | (a) | (b) | (a) | (b) |
| SMR-5 rubber | 100 | 100 | 100 | 100 | 100 | 100 |
| HAF carbon black | 50 | 50 | 50 | 50 | 50 | 50 |
| "Reogen" processing aid | 2 | 2 | 2 | 2 | 2 | 2 |
| ZDMC | | | 2 | 2 | 2 | 2 |
| HVA-2 | 3 | 3 | | | 1 | 1 |
| "DiCup 40C" | 0.75 | 0.75 | | | | |
| $DUT_2X$ | | | 6 | 6 | 4 | 4 |
| PB-MUTC | | | | | | |
| CaO | | | | | | |
| Sulfur | | | | | | |
| ZnO | | | | | | |
| Stearic Acid | | | | | | |
| MBT | | | | | | |
| MBTS | | | | | | |
| "Agerite Resin D" | 2 | | 2 | | 2 | |

TABLE I – Continued

CROSS-LINKER EVALUATION

| Formulation | Example 6 (a) | 6 (b) | 7 (a) | 7 (b) | 8 (a) | 8 (b) |
|---|---|---|---|---|---|---|
| SMR-5CV | 100 | 100 | 100 | 100 | 100 | 100 |
| HAF carbon black | 50 | 50 | 50 | 50 | 50 | 50 |
| "Reogen" processing aid | 2 | 2 | 2 | 2 | 2 | 2 |
| ZDMC | 2 | 2 | 2 | 2 | 0.1 | 0.1 |
| HVA-2 | | | 2 | 2 | | |
| "DiCup 40C" | | | | | | |
| DUT$_2$X | | | | | | |
| PB-MUTC | 11.4 | 11.4 | 8 | 8 | | |
| CaO | 4 | 4 | 4 | 4 | | |
| Sulfur | | | | | 2.5 | 2.5 |
| ZnO | | | | | 5 | 5 |
| Stearic Acid | | | | | 2 | 2 |
| MBT | | | | | 0.5 | 0.5 |
| MBTS | | | | | 0.5 | 0.5 |
| "Agerite Resin D" | | 2 | | 2 | | |

| Properties | Example 3 (a) | 3 (b) | 4 (a) | 4 (b) | 5 (a) | 5 (b) |
|---|---|---|---|---|---|---|
| % Reversion at 360°F | 0 | 0 | 45 | 45 | 22 | 28 |
| Mooney Scorch at 250°F, t$_5$ | 18.5 | 15.5 | 20.5 | 22 | 17 | 21 |
| DeMattia Flex (Kc) | | | | | | |
| Unpierced RT | 95 | 116 | 118 | 120 | 80 | 128 |
| 212°F | 33 | 84 | 148 | 1000 | 40 | 107 |
| Pierced RT | 43 | 83 | 100 | 113 | 80 | 105 |
| 212°F | 7 | 16 | 165 | 195 | 47 | 94 |
| Compression Set (%) 22 hrs. at 158°F | 7 | 14 | 38 | 45 | 28 | 24 |
| Tensile (psi) | | | | | | |
| Original | 3230 | 3500 | 3190 | 3025 | 3280 | 3010 |
| 7 Days at 212°F | 840 | 1290 | 1500 | 1915 | 1622 | 1660 |
| % Retention | 26 | 37 | 47 | 63 | 49 | 55 |

| Properties | Example 6 (a) | 6 (b) | 7 (a) | 7 (b) | 8 (a) | 8 (b) |
|---|---|---|---|---|---|---|
| % Reversion at 360°F | 11 | 8 | 3 | 3 | 32 | 33 |
| Mooney Scorch at 250°F, t$_5$ | 18.5 | 18 | 17.5 | 18 | 12 | 11.5 |
| DeMattia Flex (Kc) | | | | | | |
| Unpierced RT | 70 | 108 | 53 | 107 | 68 | 152 |
| 212°F | 40 | 120 | 41 | 70 | 152 | 400 |
| Pierced RT | 58 | 102 | 71 | 27 | 12 | 143 |
| 212°F | 15 | 25 | 29 | 15 | 40 | 30 |
| Compression Set (%) 22 hrs. at 158°F | 32 | 30 | 20 | 24 | 22 | 25 |
| Tensile (psi) | | | | | | |
| Original | 2800 | 2730 | 3030 | 2740 | 3810 | 3810 |
| 7 Days at 212°F | 1750 | 1880 | 1510 | 1870 | 625 | 1415 |
| % Retention | 62 | 69 | 49 | 69 | 16 | 37 |

| Properties | Example 3 (a) | 3 (b) | 4 (a) | 4 (b) | 5 (a) | 5 (b) |
|---|---|---|---|---|---|---|
| Modulus$_{100}$ (psi) | | | | | | |
| Original | 287 | 280 | 230 | 195 | 305 | 200 |
| 7 Days at 212°F | 200 | 240 | 320 | 305 | 285 | 245 |
| % Retention | 70 | 86 | 140 | 156 | 93 | 122 |
| Elongation (%) | | | | | | |
| Original | 380 | 440 | 550 | 575 | 515 | 525 |
| 7 Days at 212°F | 245 | 280 | 310 | 370 | 315 | 360 |
| % Retention | 65 | 64 | 56 | 64 | 61 | 69 |

| Properties | Example 6 (a) | 6 (b) | 7 (a) | 7 (b) | 8 (a) | 8 (b) |
|---|---|---|---|---|---|---|
| Modulus$_{100}$ (psi) | | | | | | |
| Original | 340 | 290 | 355 | 335 | 340 | 320 |
| 7 Days at 212°F | 450 | 410 | 410 | 350 | 625 | 1000 |
| % Retention | 132 | 141 | 115 | 105 | 184 | 312 |
| Elongation (%) | | | | | | |
| Original | 475 | 515 | 445 | 460 | 570 | 560 |
| 7 Days at 212°F | 315 | 330 | 265 | 305 | 100 | 125 |
| % Retention | 66 | 64 | 60 | 67 | 17 | 22 |

It will be seen from the foregoing Examples and evaluation tests that, in general, the addition of a bismaleimide to a urethane will result in a more efficient (and therefore more economical) vulcanization system, and in vulcanizates with superior reversion resistance and better resistance to permanent set.

EXAMPLE 9

A master batch of rubber was made up by the procedure of Example 2 but employing 40 phr of HAF carbon black, 1 phr of Reogen processing aid, 5 phr of zinc oxide, 2 phr of ZDMC catalyst, 1 phr of an antioxidant comprising a blend of 50% phenyl-B naphthylamine, 25% isopropoxy diphenylamine and 25% diphenyl-p-phenylene-diamine, (available from R. T. Vanderbilt Company as "Agerite Hipar") and 1 phr of an antioxidant comprising polymerized trimethyl dihydroquinoline (available from R. T. Vanderbilt Company as "Agerite Resin D") all per 100 parts of natural rubber (SMR-5CV).

Two test samples were compounded from the foregoing master batch, one containing 6 phr of $DUT_2X$, the diurethane obtained from 2,4-toluene diisocyanate dimer and 4-nitroso-2,6-xylenol, and the other containing 2 phr of the same diurethane ($DUT_2X$) and 3 phr of m-phenylene bis-maleimide (HVA-2). These samples were cured by heating to a temperature of about 307°F. for about 30 minutes and tested as before. The properties of the resulting vulcanizates are set forth in Table II below.

TABLE II

| Properties | Curing System | |
|---|---|---|
| | $DUT_2X$- 6 phr | DUT X:HVA-2 2:3phr |
| Mooney Scorch (250°F.) $t_{10}$ | 23'36" | 26'18" |
| Reversion at 360°F. | Pronounced | Slight (60' to 2 unit drop) |
| Original | | |
| Tensile psi | 3020 | 2740 |
| Modulus$_{100}$ | 200 | 200 |
| Modulus$_{300}$ | 1050 | 1100 |
| Compression Set (70 hrs. at 212°F.) | 64.6 | 43.4 |
| DeMattia Flex (Kc) | 140 | 200 |
| Elongation | 600 | 540 |
| Aged 70 hrs. at 212°F. | | |
| Tensile psi | 2800 | 2200 |
| Modulus$_{100}$ | 275 | 200 |
| Modulus$_{300}$ | 1300 | 1025 |
| Elongation | 540 | 500 |

EXAMPLE 10

In order to illustrate the use of the present invention for curing unsaturated elastomers other than natural rubber, a sample was prepared according to the general procedure of Example 1, but substituting a medium molecular weight acrylonitrile elastomer (Krymac 3460SP containing 34% acrylonitrile) for the natural rubber and employing 5 phr of $DUT_2X$ and 1 phr of HVA-2 as the cross-linkers together with 2 phr of ZDMC catalyst. The composition also contained 25 phr FEF (fast extrusion furnace) carbon black, 75 phr MT (medium thermal) carbon black, and 10 phr of "Paraplex." This composition was cured as above and compared to a control cured under identical conditions which contained the same amount of the catalyst but 6 phr of the $DUT_2X$ alone as the cross-linker. The vulcanizate of the present invention containing the 1 phr of HVA-2 was found to have superior compression set, 40% as compared to 22% tested at 158°F. for 22 hours. Further, the composition of the invention had a desirably longer scorch time (1.9 minute) than the 1.1 minute scorch time of the control. The tensile strength, modulus and durometer hardness of the bismaleimide vulcanizate were also superior to those of the control. Moreover, the gassing evident in the control sample was eliminated in the bismaleimide vulcanizate. The test data are set forth below.

| Curing System | Modulus$_{100}$ | Modulus$_{300}$ | Tensile | Durometer Shore A |
|---|---|---|---|---|
| $DUT_2X$ (6 phr) | 200 | 500 | 1136 | 65 |
| $DUT_2X$:HVA-2 (5:1 phr) | 220 | 830 | 1575 | 72 |

EXAMPLE 11

A base formulation of natural rubber was prepared according to Example 2 containing 100 parts of standard Malaysian natural rubber, 50 phr of HAF carbon black, 2 phr of the processing aid Reogen, 2 phr ZDMC catalyst and 4 phr of calcium oxide. Two samples of this base formulation were cured as previously, one using 8.9 phr of $DUT_2C$, the diurethane obtained from p-nitroso-m-cresol and the dimer of 2,4-toluene diisocyanate as a prior art control and the other using 6 phr of $DUT_2C$ and 2 phr of m-phenylene bismaleimide ("HVA-2") according to the invention. It should be noted that the total content of curing agent was 8.9 phr with the $DUT_2C$ alone and only 8 phr with the $DUT_2C$/HVA-2 combination cross-linker. When tested, the vulcanizates prepared according to the invention had properties superior to those of the prior art control despite the lower total concentration of cross-linker employed. The results were as follows:

| Curing System | Modulus$_{100}$ | Modulus$_{300}$ | Tensile |
|---|---|---|---|
| $DUT_2C$ (8.9 phr) | 299 | 1575 | 2446 |
| $DUT_2C$:HVA-2 (6:2 phr) | 373 | 2224 | 2938 |

The foregoing test data clearly show the surprising synergism of the combined urethane-maleimide curing systems of the invention, since a demonstrably higher degree of cross-linking is achieved by a lower content of cross-linking agent.

EXAMPLE 12

The basic natural rubber formulation of Example 11 was employed in compounding two samples one of which contained 6 phr of MUTC and the other of which contained 5 phr of MUTC and 1 phr of HVA-2, as the cross-linker. MUTC is the monourethane of 2,4-toluene diisocyanate and p-nitroso-m-cresol. When these samples were cured and tested as previously the following results were achieved.

| Curing System | Modulus$_{100}$ | Modulus$_{300}$ | Tensile |
|---|---|---|---|
| MUTC (6 phr) | 205 | 1161 | 2058 |
| MUTC:HVA-2 (5.1 phr) | 292 | 1792 | 2877 |

Here again, the test results demonstrate the synergism of the urethane-maleimide system.

EXAMPLE 13

The basic natural rubber stock of Example 11 was employed in compounding three samples, one containing 6 phr of DUT and 3 phr of a polyaryl polyisocyanate available from the Upjohn Company as "PAPI"; the second containing 5 phr DUT, 3 phr PAPI and 1 phr HVA-2 bismaleimide; and the third containing 4 phr DUT, 3 phr PAPI and 2 phr of HVA-2. DUT is the diurethane of 2,4-toluene diisocyanate and p-nitrosophenol. As noted, PAPI is a commercially available polyaryl polyisocyanate derived from N,N'-methylene-diphenyl diisocyanate (MDI). These samples were cured and tested as previously to obtain the following results:

| Curing System | Modulus$_{100}$ | Modulus$_{300}$ | Tensile |
| --- | --- | --- | --- |
| DUT:"PAPI" (6:3 phr) | 287 | 2050 | 3013 |
| DUT:"PAPI":HVA-2 (5:3:1 phr) | 332 | 2197 | 2790 |
| DUT:"PAPI":HVA-2 (4:3:2 phr) | 400 | 2563 | 3200 |

A presently unexplainable anomaly appears to exist in the tensile value of the 5:3:1 phr vulcanizate which is less than would be expected in view of the general experience that HVA-2 improves this property in the urethane-HVA-2 vulcanizate as compared to vulcanizates employing the same amount of urethane alone. It is noted, however, that the synergistic increase is obtained in the tensile of the 4:3:2 phr vulcanizate.

The synergism demonstrated above has also been observed in similar systems employing N,N'-P-phenylene bismaleimide in place of HVA-2.

What is claimed is:

1. A composition for curing diene-containing rubber which comprises a synergistic combination consisting essentially of at least one urethane cross-linking agent capable of cross-linking diene-containing rubber, and at least one maleimide cross-linking agent capable of cross-linking diene-containing rubber, the relative proportions of said maleimide cross-linking agent to said urethane cross-linking agent being in the range from about 4:1 to about 0.5:5 parts by weight, said urethane cross-linking agent being derived from a polyisocyanate and an aromatic nitroso compound the quinonoid configuration of which is unsubstituted or substituted with substituents which do not interfere with the reactivity of the nitroso group with rubber.

2. A composition according to claim 1 wherein the urethane cross-linking agent is represented by the formula:

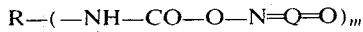

in which R represents a group selected from the group consisting of hydrocarbon groups having a functionality of at least two and polyetherglycol groups, Q is an aromatic group in the quinonoid configuration, and $m$ is an integer above 1, and wherein the maleimide cross-linking agent is selected from the group consisting of N,N'-linked bismaleimides joined directly at the nitrogen atoms and N,N'-linked bismaleimides in which the nitrogen atoms are joined to and separated by an intervening divalent radical selected from the group consisting of alkylene, cycloalkylene, oxydimethylene, phenylene, 2,6-dimethylene-4-alkylphenol and sulfonyl chloride.

3. A composition according to claim 2 wherein the polyisocyanate is selected from the group consisting of benzene diisocyanate, methylene di-(phenylisocyanate), naphthalene diisocyanate, 2,4-toluene diisocyanate, 4,4'-diisocyanato-dicyclohexane, triphenyl methane triisocyanate, and polymethylene polyphenylisocyanate, and the nitroso compound is selected from the group consisting of p-nitrosophenol, 4-nitroso-2,6-xylenol and p-nitroso-m-cresol.

4. A composition according to claim 1 wherein the urethane is the phenol-blocked monourethane of 2,4-toluene diisocyanate and p-nitroso-m-cresol, and the maleimide is m-phenylene bismaleimide.

5. A composition according to claim 1 wherein the urethane cross-linking agent is derived from a polyisocyanate dimer and a nitroso compound selected from said group of substituted and unsubstituted nitrosophenols.

6. A composition according to claim 5 wherein the polyisocyanate dimer is derived from a polyisocyanate selected from the group consisting of benzene diisocyanate, methylene di-(phenylisocyanate), naphthalene diisocyanate, 2,4-toluene diisocyanate, 4,4'-diisocyanato-dicyclohexane, triphenyl methane triisocyanate, and polymethylene polyphenylisocyanate, and the nitroso compound is selected from the group consisting of p-nitrosophenol, 4-nitroso-2,6-xylenol and p-nitroso-m-cresol.

7. A composition according to claim 6 wherein the urethane is derived from the dimer of 2,4-toluene diisocyanate and 4-nitroso-2,6-xylenol and the maleimide is m-phenylene bismaleimide.

8. A composition according to claim 6 wherein the urethane is derived from the dimer of 2,4-toluene diisocyanate and p-nitroso-m-cresol and the maleimide is m-phenylene bismaleimide.

9. A method for curing diene-containing rubber which comprises mixing the rubber with a curing composition which comprises a synergistic combination consisting essentially of at least one urethane cross-linking agent capable of cross-linking diene-containing rubber and at least one maleimide cross-linking agent capable of cross-linking diene-containing rubber, the relative proportions of said maleimide cross-linking agent to said urethane cross-linking agent being in the range from about 4:1 to about 0.1:5 parts by weight, and heating the mixture to cross-linking temperatures, said urethane cross-linking agent being derived from a polyisocyanate and an aromatic nitroso compound the quinonoid configuration of which is unsubstituted or substituted with substituents which do not interfere with the reactivity of the nitroso group with rubber.

10. A method according to claim 9 wherein the curing composition is incorporated in the rubber at a concentration of from about 0.1 to about 26 phr based on the weight of the dry rubber.

11. A method according to claim 10 wherein the curing composition is incorporated in the rubber at a concentration of from about 3 to about 8 phr based on the weight of the dry rubber.

12. A vulcanizate comprising 100 parts by weight of dry diene-containing rubber, about 1 to 20 parts by weight of at least one urethane cross-linking agent capable of cross-linking diene-containing rubber, and about 0.1 to about 6 parts by weight of a maleimide cross-linking agent capable of cross-linking diene-containing rubber, said urethane cross-linking agent being derived from a polyisocyanate and an aromatic nitroso compound the quinonoid configuration of which is unsubstituted or substutited with substituents which do not interfere with the reactivity of the nitroso group with rubber.

13. A vulcanizate according to claim 12 wherein the content of urethane cross-linking agent is about 2 to about 8 parts by weight, and in which the maleimide is a bismaleimide present in an amount of about 0.5 to about 3 parts by weight.

14. A vulcanizate according to claim 13 wherein the bismaleimide is present in an amount of about 1 to about 2 parts by weight.

15. A composition according to claim 1 having incorporated therein at least one accelerator for said urethane cross-linking agent.

16. A composition according to claim 15 wherein the relative proportion of accelerator to urethane cross-linking agent is in the range from about 0.1:16 to about 5:1.

17. A composition according to claim 16 wherein said urethane cross-linking agent has the formula:

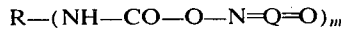

R—(NH—CO—O—N=Q=O)$_m$ wherein R is selected from the group consisting of hydrocarbon groups having a functionality of at least two and polyetherglycol groups, Q is an aromatic group in the quinonoid configuration, and $m$ is an integer above 1; and wherein said maleimide cross-linking agent is selected from the group consisting of N,N'-linked bismaleimides joined directly at the nitrogen atoms and N,N'-linked bismaleimides in which the nitrogen atoms and joined to and separated by an intervening divalent radical selected from the group consisting of alkylene, cycloalkylene, oxydimethylene, phenylene, 2–6, dimethylene-4-alkylphenol, and sulfonyl chloride.

18. A composition according to claim 17 wherein said polyisocyanate is selected from the group consisting of benzene diisocyanate, methylene di(-phenylisocyanate), naphthalene diisocyanate, 2,4-toluene diisocyanate, 4,4'-diisocyanato-dicyclohexane, triphenyl methane triisocyanate and polymethylene polyphenylisocyanate; and said nitroso compound is selected from the group consisting of p-nitroso-phenol, 4-nitroso-2,6-xylenol and p-nitroso-m-cresol.

19. A composition according to claim 18 wherein said accelerator is selected from the group consisting of the zinc, cadmium, tellurium, bismuth, tin and lead salts of thiols which are effective as accelerators.

20. A composition according to claim 15 wherein said urethane cross-linking agent is the phenol-blocked monourethane of 2,4-toluene diisocyanate and p-nitroso-m-cresol, and said maleimide is m-phenylene bismaleimide.

21. A composition according to claim 17 wherein said urethane cross-linking agent is derived from a polyisocyanate dimer and a nitroso compound selected from said group of substituted and unsubstituted nitrosophenols.

22. A composition according to claim 21 wherein said polyisocyanate dimer is derived from a polyisocyanate selected from the group consisting of benzene diisocyanate, methylene di-(phenylisocyanate), naphthalene diisocyanate, 2,4-toluene diisocyanate, 4,4'-diisocyanato-dicyclohexane, triphenyl methane triisocyanate, and polymethylene polyphenylisocyanate, and the nitroso compound is selected from the group consisting of p-nitroso-phenol, 4-nitroso-2,6-xylenol, and p-nitroso-m-cresol.

23. A composition according to claim 22 wherein said accelerator is selected from the group consisting of the zinc, cadmium, tellurium, bismuth, tin and lead salts of thiols which are effective as accelerators.

24. A composition according to claim 22 wherein said urethane is derived from the dimer of 2,4-toluene diisocyanate and 4-nitroso-2,6-xylenol and said maleimide is m-phenylene bismaleimide.

25. A composition according to claim 22 wherein said urethane is derived from the dimer of 2,4-toluene diisocyanate and p-nitroso-m-cresol and said maleimide is m-phenylene bismaleimide.

26. A method according to claim 9 wherein said curing composition includes at least one accelerator for said urethane cross-linking agent.

27. A method according to claim 26 wherein the amount of said accelerator is in the range from about 0.1 to about 5 parts by weight per 100 parts by weight of diene-containing rubber.

28. A vulcanizate according to claim 12 having incorporated therein from about 0.1 to about 5 parts by weight of at least one accelerator for said urethane cross-linking agent.

29. A vulcanizate according to claim 13 having incorporated therein from about 1.5 to about 2.5 parts by weight of at least one accelerator for said urethane cross-linking agent.

30. A vulcanizate according to claim 29 wherein said bismaleimide is present in an amount in the range from about 1 to about 2 parts by weight.

31. A composition according to claim 15 wherein said accelerator is selected from the group consisting of the zinc, cadmium, tellurium, bismuth, tin and lead salts of thiols which are effective as accelerators.

32. A composition according to claim 13 wherein said accelerator is selected from the group consisting of the zinc, cadmium, tellurium, bismuth, tin and lead salts of dialkyldithiocarbamates which are effective as accelerators.

33. A composition according to claim 15 wherein said accelerator is selected from the group consisting of the zinc, cadmium, tellurium, bismuth, tin and lead salts of dithiophosphates which are effective as accelerators.

34. A composition according to claim 18 wherein said accelerator is selected from the group consisting of the zinc, cadmium, tellurium, bismuth, tin and lead salts of dialkyldithiocarbamates, which are effective as accelerators.

35. A composition according to claim 18 wherein said accelerator is selected from the group consisting of the zinc, cadmium, tellurium, bismuth, tin and lead salts of dithiophosphates which are effective as accelerators.

36. A composition according to claim 22 wherein said accelerator is selected from the group consisting of the zinc, cadmium, tellurium, bismuth, tin and lead salts of dialkyldithiocarbamates which are effective as accelerators.

37. A composition according to claim 22 wherein said accelerator is selected from the group consisting of the zinc, cadmium, tellurium, bismuth, tin and lead salts of dithiophosphates which are effective as accelerators.

* * * * *